April 15, 1924. 1,490,279
S. KUCHARSKI
MEANS FOR GUIDING CINEMATOGRAPH FILMS
Filed Sept. 1, 1921
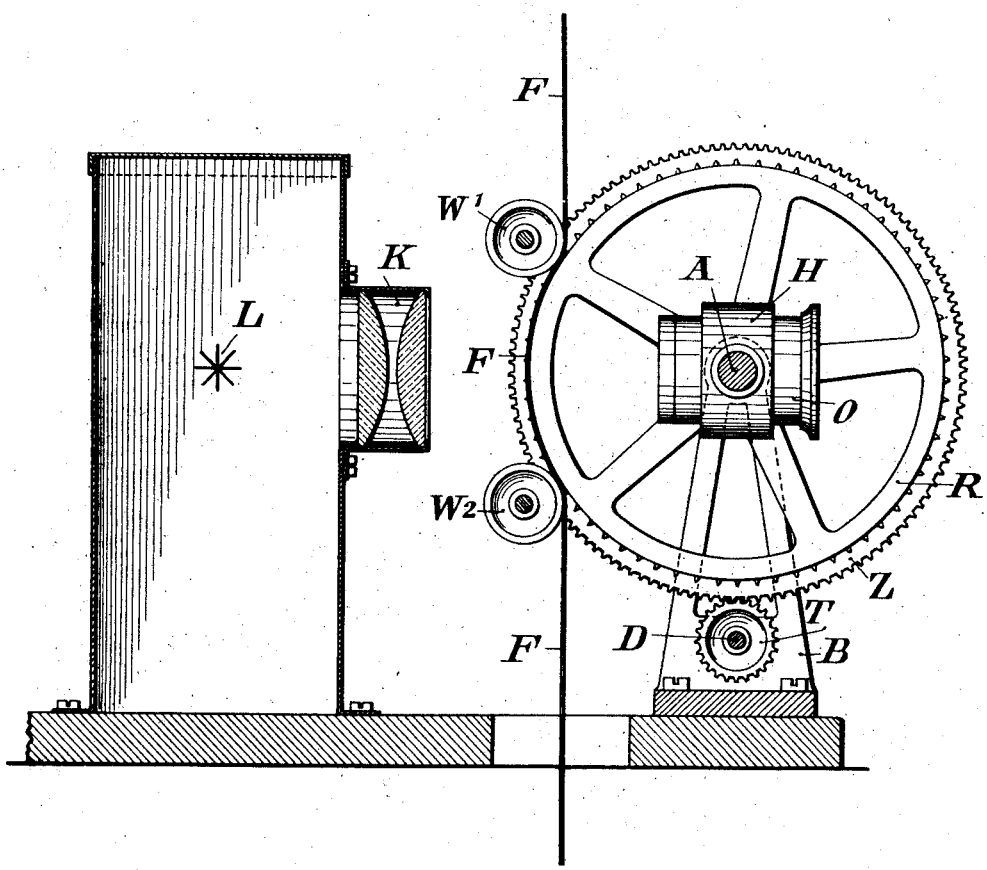
INVENTOR
Stanislaus Kucharski
BY ATTORNEY
Pennie Davis Marvin & Edmonds Patented Apr. 15, 1924.

1,490,279

UNITED STATES PATENT OFFICE.

STANISLAUS KUCHARSKI, OF CHARLOTTENBURG, NEAR BERLIN, GERMANY.

MEANS FOR GUIDING CINEMATOGRAPH FILMS.

Application filed September 1, 1921. Serial No. 497,809.

*To all whom it may concern:*

Be it known that I, STANISLAUS KUCHARSKI, engineer, a citizen of Germany, residing at Charlottenburg, near Berlin, Dernburgstrasse 45, Germany, have invented certain new and useful Improvements in Means for Guiding Cinematograph Films (for which I have filed applications in Germany, May 18, 1920; Germany, May 18, 1920, and Great Britain, September 30, 1920), of which the following is a specification.

The invention relates to cinematograph apparatus of the type in which the film is continuously moved and the movement is optically compensated by means of a rocking mirror or the like, the friction of the film against the gate being eliminated and consequently the useful life of the film prolonged by leading the edges of the film over two toothed wheels, the portion of the film bearing the images lying freely between the wheels.

According to the invention the objective is placed at or approximately at the centre of the wheels, the axis of the objective intersecting the projected portion of the film, the radius of the wheels conforming approximately to the focal length of the objective and the common axis of the wheels intersecting the axis of the objective at right angles. By this arrangement the sharpness of definition of the picture is not affected by the displacement of the film.

An example of a construction according to the invention is shown in the accompanying drawing. L is the source of light, K the condenser, F the film and O the objective. The objective is carried by a ring H, lateral extensions A of which are formed as axles and engage in pedestal bearing supports B. On the axles A on each side of the objective is a toothed wheel R so arranged that the teeth engage with the perforations of the film. The film is held against these wheels by rollers $W^1$ and $W^2$ and since the breadth of these wheels is such that they only engage the perforated edges of the film, the image portion of the film between the rollers $W^1$ and $W^2$ is perfectly free. In the example shown, the optical centre of the objective corresponds with the centre of the wheel, but the objective may be displaced slightly from this central position without any appreciable reduction in the sharpness of the picture on the screen. The wheels R carry toothed rims Z which are driven by pinions T which are secured to a shaft D. By the rotation of the axle D the film is set in motion.

I claim:—

In a device of the type described, the combination of two toothed wheels, adapted to engage perforations in the edges of the film, said wheels being spaced to permit free passage of light rays between them and having radii substantially equal to the focal length of the objective of the device, said wheels having a common axis passing through the optical center of the objective.

In testimony whereof I have affixed my signature in presence of two witnesses.

STANISLAUS KUCHARSKI.

Witnesses:
GUSTAV PIETROL,
PAUL MASSOVA.